United States Patent
Emigh et al.

(10) Patent No.: US 10,771,173 B2
(45) Date of Patent: *Sep. 8, 2020

(54) PRESENCE DETECTION USING BLUETOOTH AND HYBRID-MODE TRANSMITTERS

(71) Applicant: shopkick, Inc., Redwood City, CA (US)

(72) Inventors: Aaron T. Emigh, Incline Village, NV (US); Vivek Shrivastava, San Francisco, CA (US); Steven Stanek, Fremont, CA (US)

(73) Assignee: shopkick, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,854

(22) Filed: Feb. 4, 2014

(65) Prior Publication Data

US 2014/0220883 A1 Aug. 7, 2014

Related U.S. Application Data

(60) Provisional application No. 61/760,320, filed on Feb. 4, 2013, provisional application No. 61/913,859, filed on Dec. 9, 2013.

(51) Int. Cl.
*H04H 20/61* (2008.01)
*G06Q 30/02* (2012.01)
(Continued)

(52) U.S. Cl.
CPC ......... *H04H 20/61* (2013.01); *G06Q 30/0269* (2013.01); *G06Q 30/0281* (2013.01);
(Continued)

(58) Field of Classification Search
CPC ............... G06Q 30/00; G06Q 30/0205; G06Q 30/0207; G06Q 30/0211; G06Q 30/0214;
(Continued)

(56) References Cited

U.S. PATENT DOCUMENTS 7,636,338 B1   12/2009   Vu
8,694,782 B2   4/2014    Lambert
(Continued)

FOREIGN PATENT DOCUMENTS

CN   102882637        1/2013
JP   2004516588 A     6/2004
(Continued)

OTHER PUBLICATIONS

IOS—What is the iBeacon Bluetooth Profile—Stack Overflow, edited Sep. 24, 2013 at 7:48; ChinaPaul.*
(Continued)

*Primary Examiner* — Yuwen Pan
*Assistant Examiner* — Paul P Tran
(74) *Attorney, Agent, or Firm* — Finnegan, Henderson, Farabow, Garrett & Dunner LLP

(57) ABSTRACT

Presence detection using Bluetooth and hybrid-mode transmitters is disclosed. In some embodiments, one or more transmitters are configured to transmit an iBeacon broadcast and a proprietary Bluetooth Low Energy (BTLE) broadcast, wherein at least one of the transmitted broadcasts includes an identifier that specifies a venue. The broadcasts are captured by a handset and decoded to infer presence of the handset at the venue.

20 Claims, 6 Drawing Sheets

(51) Int. Cl.
*H04H 60/52* (2008.01)
*H04L 29/06* (2006.01)
*H04W 8/00* (2009.01)
*H04W 4/80* (2018.01)

(52) U.S. Cl.
CPC .......... *H04H 60/52* (2013.01); *H04L 63/0823* (2013.01); *H04W 8/005* (2013.01); *H04W 4/80* (2018.02)

(58) Field of Classification Search
CPC ........... G06Q 30/0226; G06Q 30/0261; G06Q 10/0875; G06Q 20/202; G06Q 30/02; G06Q 30/0623; G06Q 30/0222; G06Q 30/0242; G06Q 30/0282; G06Q 30/0601; G06Q 20/3224; G06Q 30/0269; G06Q 30/0281; H04B 5/0031; H04B 5/0043; H04B 5/0062; H04B 5/0075; H04M 2250/04; H04M 2250/12; H04W 4/008; H04W 4/02; H04W 4/04; H04W 4/043; H04W 4/06; H04W 4/20; H04W 4/206; H04W 4/21; H04W 8/005; H04W 64/00; H04W 76/02; H04W 76/023; H04W 84/18; H04W 84/20; H04W 4/021; H04W 4/028; H04W 12/00; H04W 12/04; H04W 12/06; H04W 48/08; H04W 88/06; H04W 4/80; G06F 21/60; G06F 3/048; G06F 8/65; H04H 20/61; H04H 60/52; H04L 67/18; H04L 67/24; H04L 67/306; H04L 69/18; H04L 12/18; H04L 12/189; H04L 63/0823; H04L 63/02; H04L 63/20; G01S 5/02; G01S 5/0257; G01S 5/18; G01C 21/00; G06K 7/10128; G06K 7/10237
USPC ... 455/3.01, 41.1, 41.2, 412.1, 414.1, 426.1, 455/456.1, 456.3; 705/14.12, 14.38, 705/14.58, 26.1, 35; 235/382, 382.5, 235/383; 340/539.13, 539.23, 382, 382.5, 340/383; 707/706, 763; 717/173
See application file for complete search history.

(56) References Cited

U.S. PATENT DOCUMENTS

| | | | |
|---|---|---|---|
| 8,831,642 B2 | 9/2014 | Moldavsky et al. | |
| 9,787,616 B2* | 10/2017 | Xu .......................... | G06Q 50/10 |
| 2002/0059400 A1* | 5/2002 | Ikami ...................... | H04L 29/06 709/219 |
| 2004/0179501 A1 | 9/2004 | Marsan et al. | |
| 2004/0266439 A1 | 12/2004 | Lynch, Jr. et al. | |
| 2005/0090264 A1* | 4/2005 | Kim ....................... | H04W 48/10 455/455 |
| 2005/0233746 A1* | 10/2005 | Laroia .................... | H04B 1/005 455/436 |
| 2006/0190535 A1 | 8/2006 | Kaitaniemi et al. | |
| 2006/0193315 A1* | 8/2006 | Sinivaara .............. | H04W 48/10 370/389 |
| 2007/0138268 A1 | 6/2007 | Tuchman | |
| 2007/0141988 A1 | 6/2007 | Kuehnel et al. | |
| 2007/0217588 A1* | 9/2007 | Bitterlich ................ | G06F 8/656 379/201.03 |
| 2008/0040713 A1 | 2/2008 | Subbakrishna et al. | |
| 2008/0062940 A1* | 3/2008 | Othmer ................... | H04L 67/18 370/338 |
| 2008/0245863 A1* | 10/2008 | Buchheit ................ | G06Q 30/06 235/383 |
| 2009/0215393 A1* | 8/2009 | Smyers ....................... | 455/41.2 |
| 2009/0316614 A1* | 12/2009 | Kim ....................... | H04B 7/2615 370/312 |
| 2010/0007485 A1* | 1/2010 | Kodrin et al. ........... | 340/539.13 |
| 2010/0063867 A1* | 3/2010 | Proctor, Jr. ........ | G06Q 30/0623 455/414.1 |
| 2010/0120362 A1 | 5/2010 | Walley et al. | |
| 2010/0202423 A1* | 8/2010 | Karaoguz .......... | G06Q 30/0241 370/338 |
| 2010/0279647 A1 | 11/2010 | Jacobs | |
| 2011/0029370 A1 | 2/2011 | Roeding et al. | |
| 2011/0153818 A1 | 6/2011 | Vandwalle et al. | |
| 2011/0164527 A1 | 7/2011 | Mishra | |
| 2011/0238476 A1 | 9/2011 | Carr | |
| 2011/0255454 A1 | 10/2011 | Hauser et al. | |
| 2012/0214417 A1 | 8/2012 | Woo et al. | |
| 2012/0254298 A1* | 10/2012 | Lee ................... | H04N 21/25816 709/203 |
| 2013/0065584 A1* | 3/2013 | Lyon et al. ................... | 455/434 |
| 2013/0217332 A1* | 8/2013 | Altman .................. | H04H 60/90 455/41.2 |
| 2013/0219157 A1* | 8/2013 | Lee ........................ | G06F 1/3206 713/1 |
| 2013/0259230 A1 | 10/2013 | Polo | |
| 2013/0281084 A1* | 10/2013 | Batada et al. ............. | 455/426.1 |
| 2013/0297422 A1* | 11/2013 | Hunter ............... | G06Q 30/0261 705/14.58 |
| 2013/0318357 A1 | 11/2013 | Abraham | |
| 2014/0133656 A1* | 5/2014 | Wurster ................ | H04L 9/0637 380/270 |
| 2015/0003433 A1* | 1/2015 | Sinha ................... | H04L 63/107 370/338 |

FOREIGN PATENT DOCUMENTS

| | | |
|---|---|---|
| KR | 10-2007-0008681 | 1/2007 |
| KR | 10-2012-0049306 | 5/2012 |
| WO | 2003088108 | 10/2003 |
| WO | 2010109271 | 9/2010 |
| WO | 2011014292 | 2/2011 |
| WO | 2013006315 | 1/2013 |

OTHER PUBLICATIONS

Specification vol. 0—Specification of the Bluetooth System—Master Table of Contents & Compliance Requirements; Covered Core Package version 4.0; Current master TOC Publication date: Jun. 30, 2010. Bluetooth Specification Version 4.0 [vol. 0]; pp. 1331-1332.*

Rao. PayPal Debuts Its Newest Hardware, Beacon, a Bluetooth LE Enabled Device for Hands-Free Check Ins and Payments. Techcrunch.com. Sep. 9, 2013 (Sep. 9, 2013). Retrieved on [Oct. 5, 2014]. Retrieved from the Internet: URL <http://techcrunch.com/2013/09/09/paypal-debuts-its-newest-hardware-beacon-a-bluetooth-le-enabled-device-for-hands-free-check-ins-and-payments/>.

Lovejoy. iBeacon briefing: What is it, and what can we expect from it? 9to5Mac.com. Sep. 27, 2013. Retrieved on May 10, 2014. Retrieved from the Internet: URL <http://9to5mac.com/2013/09/27/ibeacon-briefing-what-is-it-and-what-can-we-expect-from-it/?>.

Dilger. Inside iOS 7: iBeacons enhance apps' location awareness via Bluetooth LE. Appleinsider.com. Jun. 19, 2013. Retrieved on [Oct. 5, 2014]. Retrieved from the Internet: URL <http://appleinsider.com/articles/13/06/19/inside-ios-7-ibeacons-enhance-apps-location-awareness-via-bluetooth-le>.

Betters. Apple's iBeacons explained: What it is and why it matters. Pocket-lint.com. Sep. 18, 2013. Retrieved on [Oct. 5, 2014]. Retrieved from the Internet: URL<http://www.pocket-lint.com/news/123730-apple-s-ibeacons-explained-what-it-is-and-why-it-matters>.

"Sean 0 Sullivan: ""Could Shopkick potentially also use bluetooth to provide the same solution?"" Jan. 26, 2012 (Jan. 26, 2012). pp. 1-3. XP002759709. Retrieved from the Internet:URL:https://www.quora.com/Could-Shopkick-potentially-also-use-bluetooth-to-provide-the-same-solution [retrieved on Jul. 11, 2016] * the whole document *".

"Sean 0 Sullivan: ""What is the range of the Shopkick audio transmitter device?"", Aug. 23, 2012 (Aug. 23, 2012). pp. 1-2. XP002759710. Retrieved from the Internet:URL:https://www.quora.

(56) References Cited

OTHER PUBLICATIONS com/What-is-the-range-of-the-Shopkick-audio-transmitter-device [retrieved on Jul. 11, 2016]* the whole document *".
Sean 0 Sullivan: "What problem does Shopkick solve?" Aug. 8, 2012 (Aug. 8, 2012). pp. 1-2. XP002759711. Retrieved from the Internet: URL:https://www.quora.com/What-problem-does-Shopkick-solve [retrieved on Jul. 11, 2016] * the whole document *.
Kakegawa, "iOS 7" Use New Region Observing Service iBeacon, Bevelopers, IO, "Online", Sep. 25, 2013, "Searched on Aug. 3, 2016", Internet, URL, <http://dev.classmethod.jp/references/ios7-ibeacon-api/>.
Part 2 • Use iBeacon with iOS7!, Gaprot Technical Information Site for Application Engineer, "Online", Nov. 7, 2013, "searched on Aug. 3, 2016", Internet, URL, <https://www.gaprot.jp/pickup/ibeacon-ios>.

* cited by examiner

US 10,771,173 B2

PRESENCE DETECTION USING BLUETOOTH AND HYBRID-MODE TRANSMITTERS

CROSS REFERENCE TO OTHER APPLICATIONS

This application claims priority to U.S. Provisional Patent Application No. 61/760,320 entitled PRESENCE DETECTION USING BLUETOOTH AND HYBRID-MODE TRANSMITTERS filed Feb. 4, 2013 which is incorporated herein by reference for all purposes. This application also claims priority to U.S. Provisional Patent Application No. 61/913,859 entitled PRESENCE DETECTION USING BLUETOOTH AND HYBRID-MODE TRANSMITTERS filed Dec. 9, 2013 which is incorporated herein by reference for all purposes.

BACKGROUND OF THE INVENTION

Current technologies for detecting presence suffer from many limitations, including high costs of hardware and/or installation (e.g., for wifi triangulation) and reliance on handset audio channels that may vary (e.g., for ultrasonic audio based technologies).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, and/or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below. The invention is described in connection with such embodiments, but the invention is not limited to any embodiment. The scope of the invention is not limited by these embodiments, and the invention encompasses numerous alternatives, modifications, and equivalents. Numerous specific details are set forth in the following description in order to provide a thorough understanding of the invention. These details are provided for the purpose of example, and the invention may be practiced without some or all of these specific details. For the purpose of clarity, technical material that is known in the technical fields related to the invention has not been described in detail so that the invention is not unnecessarily obscured.

Presence detection, e.g., at a venue such as a store, can be used for a variety of purposes, such as presenting content relevant to the venue at which presence is detected (for example content that a user has indicated as favorite content or content that is recommended by a recommendation system using prior user behavior and/or externally available data such as Facebook Open Graph data as inputs) or issuing a reward in exchange for presence at the venue. Some benefits of presence detection are delineated in prior U.S. patent application Ser. No. 13/197,763, entitled METHOD AND SYSTEM FOR PRESENCE DETECTION, filed Aug. 3, 2011, which is herein incorporated by reference in its entirety for all purposes, as if set forth in full herein. All applications enumerated therein may be used with respect to presence detection techniques as described herein, and its description of an ultrasonic-based transmitter can be taken as a description of possible operation of the audio-based transmitter component(s) described herein.

Figure 1A:
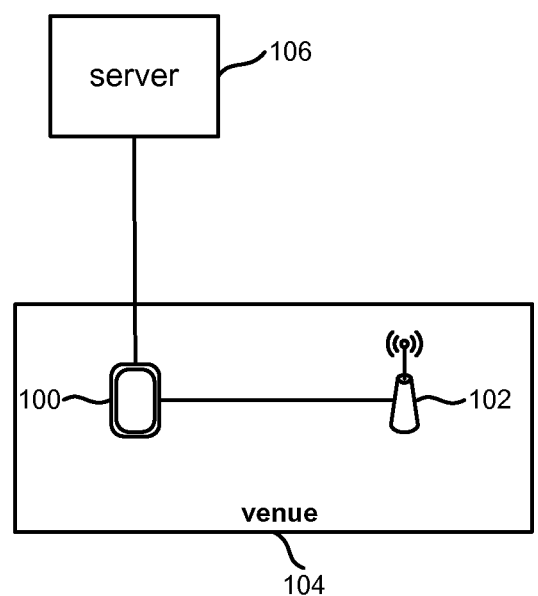
FIG. 1A is a high level block diagram illustrating an embodiment of components that may be employed for presence detection.

FIG. 1A is a high level block diagram illustrating an embodiment of components that may be employed for presence detection. In the given example, handset 100 detects presence of transmitter 102 on the premises of venue 104 and reacts accordingly, e.g., by communicating with server 106 via a wireless network. Transmitter 102 may be configured for one or more of the following functionalities: to broadcast store and department identifiers detectable by mobile users using both audio and Bluetooth technologies; to prevent replay attacks and rogue transmitters from cheating; to passively detect when a user enters a store and notify the user of any relevant information, including, but not limited to, notifying the user to open an application and redeem existing rewards (e.g., points); and to update the store and department identifiers broadcast by the transmitter remotely and securely from a mobile handset.

The term "handset" as used herein may refer to any mobile computing device, such as a smartphone, a tablet, etc. A typical handset, such as handset 100 of FIG. 1A, includes a microprocessor, a memory coupled to the microprocessor providing both code that the microprocessor executes and data under the control of the microprocessor, a display (e.g., a touch-sensitive display) through which the user may view and interact with user interface elements, a Bluetooth transceiver, a microphone, a cellular and/or wifi transceiver, and various other components. For the purposes of this exposition, when it is said that a handset performs a technique, this should be taken to mean that the microprocessor performs operations according to the code stored in its associated memory and interacts with other components within the handset, as necessary, to perform said technique.

In some embodiments, a transmitter, such as transmitter 102 of FIG. 1A, incorporates two technologies: a Bluetooth Low Energy (BTLE) module and an on-board audio module (e.g., comprising a DAC and tweeter) that allow the transmitter to broadcast identifiers in two media. Bluetooth and BTLE as used herein, as well as many Bluetooth specific terms known to those skilled in the art, are as set forth in the Specification of the Bluetooth System, version 4.0, dated Jun. 30, 2010, available online from the Bluetooth Special Interest Group at https://www.bluetooth.org/Technical/Specifications/adopted.htm and/or https://www.bluetooth.org/docman/handlers/downloaddoc.ashx?doc_id=229737, which are herein incorporated by reference in their entirety for all purposes, as if set forth in full herein.

Figure 1B:
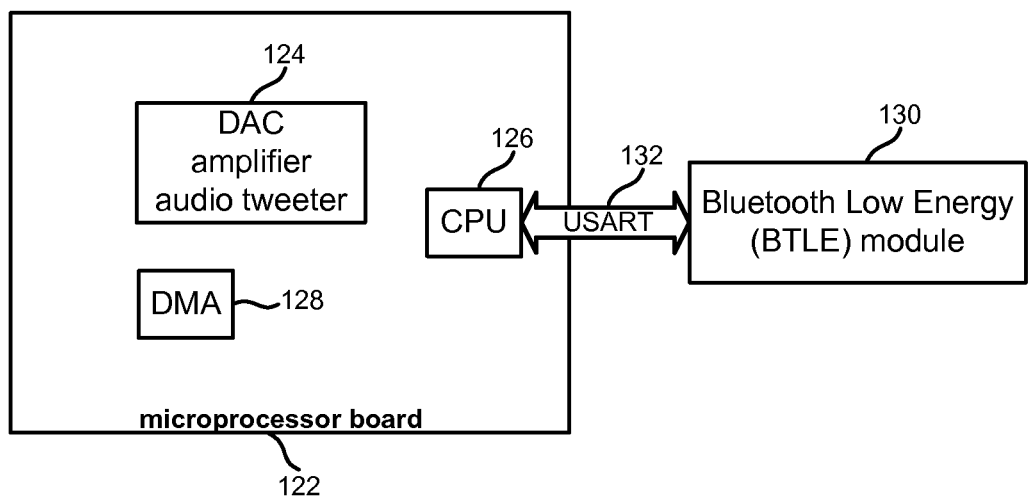
FIG. 1B is a high level block diagram illustrating an embodiment of a transmitter.

FIG. 1B is a high level block diagram illustrating an embodiment of a transmitter. For example, transmitter 120 of FIG. 1B comprises transmitter 102 of FIG. 1A. As depicted, transmitter 120 includes a microprocessor board 122. Note that use of the terminology "board" does not imply that a separate physical board is needed; all components (or all components except the tweeter) may be included in a single physical board. Microprocessor board 122 comprises an onboard digital-to-analog converter (DAC) and broadcasts store and/or department identifier(s) through an amplifier connected to a tweeter as depicted via block 124. As used herein, the term "tweeter" refers to a transducer capable of reproducing sound in an appropriate spectrum, e.g., ultrasonic frequencies relevant to an ultrasonic transmitter. As depicted, microprocessor board 122 further includes central processing unit (CPU) 126 and direct memory access (DMA) 128. In some embodiments, the DAC may be integrated into the CPU. Transmitter 120 further includes a Bluetooth Low Energy (BTLE) module 130. In some embodiments, BTLE module 130 comprises a standalone BTLE module that runs a minimalist stack and talks to microprocessor board 122 over universal synchronous/asynchronous receiver/transmitter (USART) link 132.

In some embodiments, a transmitter (e.g., transmitter 102 of FIG. 1A or transmitter 120 of FIG. 1B) broadcasts store and/or department identifier(s) using both audio and Bluetooth channels. In some embodiments, for audio, an identifier is encoded using ultrasonic frequencies and broadcast using a tweeter. In some embodiments, for Bluetooth, an identifier is embedded in the advertisement parameters of a Bluetooth beacon and broadcast as a service that can be detected by mobile handsets using passive scanning of Bluetooth channels.

Figure 2:
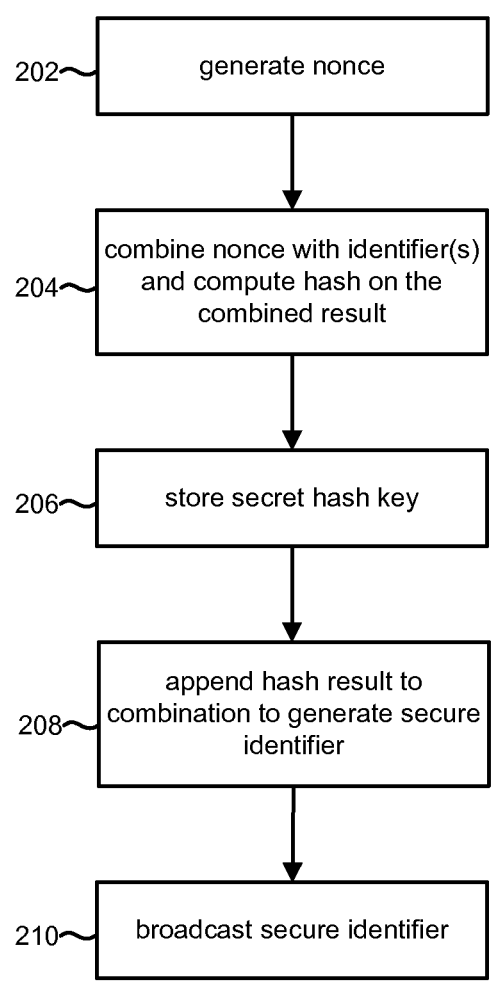
FIG. 2 is a flow chart illustrating an embodiment of a process for broadcasting a secure identifier.

FIG. 2 is a flow chart illustrating an embodiment of a process for broadcasting a secure identifier or code. In some embodiments, code rotation is employed for preventing fraud. Process 200 specifically employs a nonce and hashing mechanism for preventing replay attacks. At step 202, a nonce is generated. A nonce, which is never repeated, may be periodically generated by a transmitter (e.g., transmitter 102 of FIG. 1A or transmitter 120 of FIG. 1B) using any appropriate technique. For example, in some embodiments, a hash of a current timestamp from the microprocessor or Bluetooth clock is used to generate the nonce. In another example, a simple monotonically increasing sequence that is updated periodically is used to generate the nonce. In such cases, the periodicity of the increments may be selected appropriately and/or changed dynamically. An example of an increment is ten minutes.

At step 204, the nonce generated at step 202 is combined with store and/or department identifier(s) that need to be broadcasted, and an irreversible hash is computed on the combined result. The term "hash" is used informally for the purpose of this discussion and includes a keyed hash with a secret key in addition to any explicitly mentioned content being hashed. The hash may comprise any cryptographic hash function known to those skilled in the art, such as SHA-1, MD5, etc. An example of what may be meant as a "hash" is an HMAC using SHA-1. HMAC is described in the Internet Engineering Task Force (IETF) RFC 2104, available online from the IETF at http://tools.ietf.org/html/rfc2104, which is included herein by reference for all purposes, as if set forth herein in its entirety.

At step 206, a secret hash key is stored. For example, the secret hash key is burned into a memory, such as within transmitter microprocessor code, and is not exposed to any external parties.

At step 208, the hash result is appended at the end of the combination to generate a secure identifier for broadcasting according to the following formula:

secure identifier=(nonce+store identifier+hash (nonce+store identifier))

As used herein, the store identifier may include a department identifier, either as a separate component of the store identifier, or as a single identifier that is associated, for example in a database, with separate store and department identifiers. In one example of a generated secure identifier, four bytes are used for the nonce, eight bytes are used for the store identifier, and four bytes are used for the hash.

At step 210, the secure identifier generated at step 208 is broadcasted. In some embodiments, a broadcast is preceded by appropriately configuring BTLE module 130 to update service parameters, e.g., via USART 132. In some embodiments, the Bluetooth service identifier is set to a prescribed (e.g., the shopkick) service identifier. The service identifier is a constant (e.g., 128 bit) universally unique identifier (UUID) to allow passive scanning under a handset operating system, such as iOS or Android. In such cases, the secure identifier may be broadcasted as service parameters for the constant (shopkick) service. Thus, step 210 may include broadcasting the constant service UUID and the secure identifier as the service parameters via Bluetooth beacons and optionally modulating it (or a modified version, such as the store identifier instead of the service identifier, or a version without the department code) using ultrasonic frequencies.

A secure identifier broadcast by a transmitter (e.g., transmitter 102 of FIG. 1A or transmitter 120 of FIG. 1B) may be captured by mobile handsets of users through an audio channel by capturing sound on a microphone, by actively scanning Bluetooth advertisements, and/or by utilizing features of a handset operating system to passively scan. For example, a list of service UUIDs to listen for may be provided, and a notification may be received when any identifier from the list is detected.

Figure 3A:
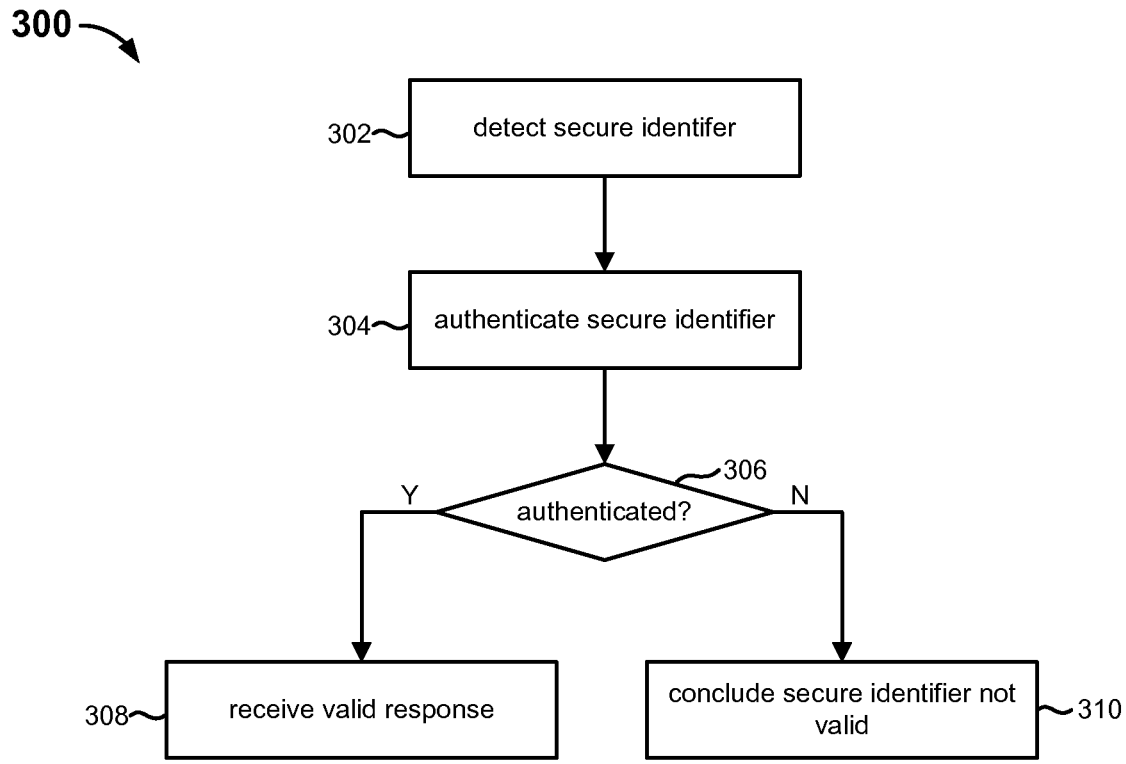
FIGS. 3A-3B are flow charts illustrating embodiments of processes for validating a received secure identifier.
Figure 3B:
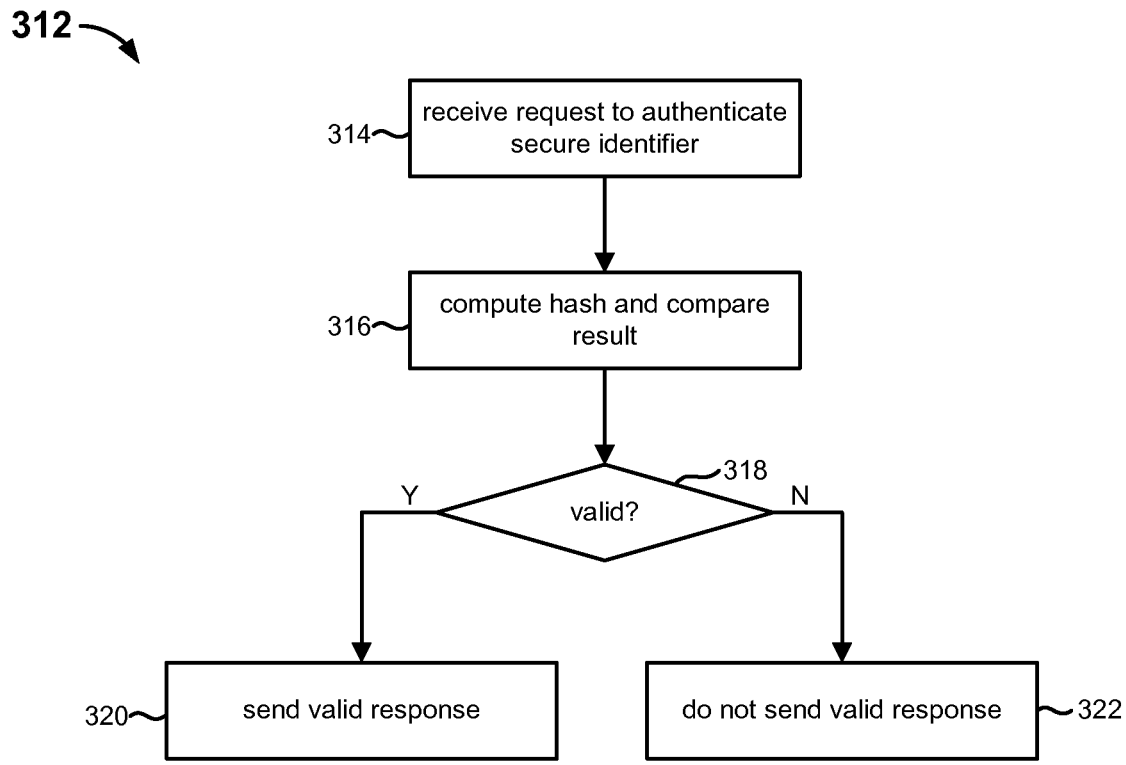

FIGS. 3A-3B are flow charts illustrating embodiments of processes for validating a received secure identifier.

Process 300 of FIG. 3A, for example, may be employed by a mobile handset. At step 302, a secure identifier is detected. At step 304, the secure identifier is authenticated. For example, the secure identifier may be sent to an associated (e.g., shopkick) server for authentication. In alternate embodiments, such processing may be performed on the handset. If the server is unavailable for any reason, the secure identifier may be cached and relayed to the server when it becomes reachable. In order to support such offline walk-ins, each nonce may be valid for a predetermined period of time (e.g., one hour). At step 306, it is determined whether the secure identifier is authenticated. If the secure identifier is authenticated, a valid response is received at step 308 in response to the authentication processing of step 304. If the secure identifier is not authenticated, it is concluded at step 310 that the secure identifier is not valid. That is, a valid response is not received at step 310 in response to the authentication processing of step 304, but instead, for example, no response or an indication that the secure identifier is fraudulent may be received at step 310.

Process 312 of FIG. 3B, for example, may be employed server side, e.g., at a server associated with a mobile application that detects the secure identifier at a handset. At step 314, a request to authenticate a secure identifier is received from a mobile application. At step 316, a hash is computed, and the result is compared with the hash bytes included with the secure identifier. For example, at step 316, an irreversible hash may be computed on the (nonce+store identifier) combination along with the secret key, e.g. using an HMAC, and the result compared with the hash bytes on the secure identifier. At step 318, it is determined if the secure identifier is valid. If it is determined that the secure identifier is valid (e.g., because the hash matches and the nonce in the secure identifier is still valid), a valid response is sent to the client at step 320. If it is determined that the secure identifier is not valid, the request is discarded and/or logged as a fraudulent attempt at step 322, and a valid response is not sent to the client.

An advantage of integrating a Bluetooth module in the transmitter is the ability to interact with the transmitter from a mobile handset, including the ability to update some components of the transmitter code and other parameters from a smartphone.

Figure 4:
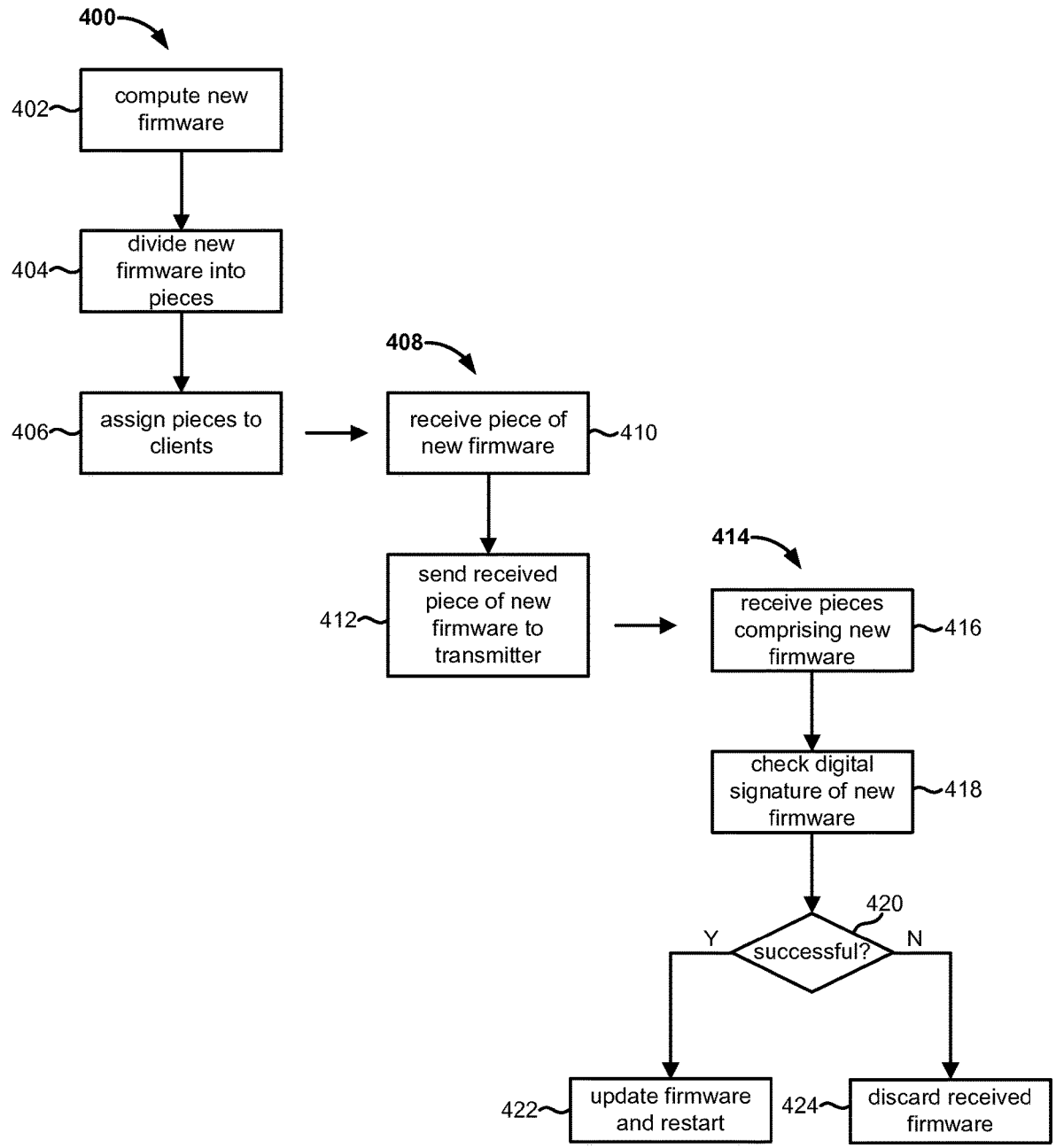
FIG. 4 comprises flow charts illustrating embodiments of processes associated with updating the firmware on a transmitter.
Figure 5:
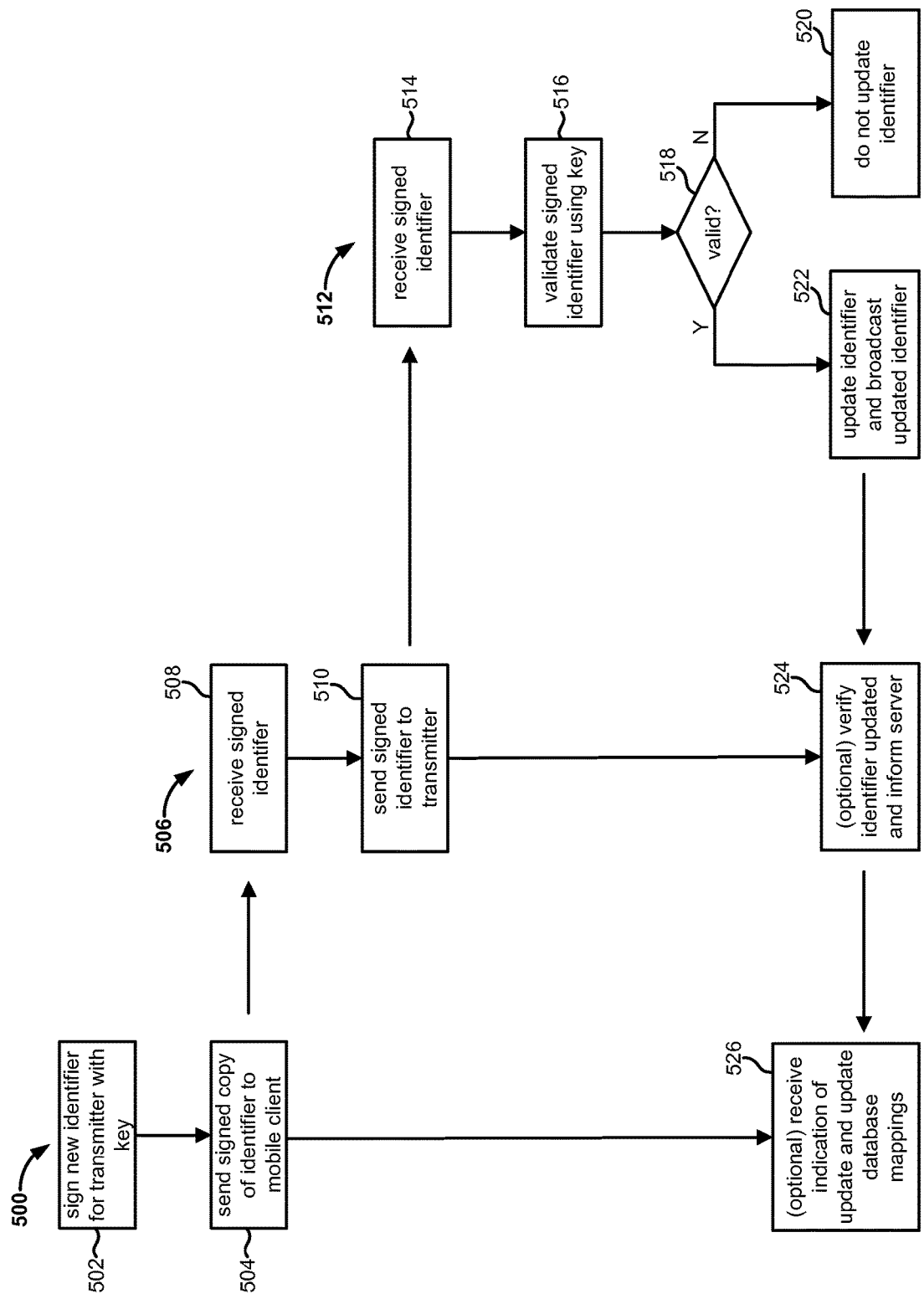
FIG. 5 comprises flow charts illustrating embodiments of processes associated with updating the transmitter identifier of a transmitter.

FIGS. 4-5 are flow charts illustrating embodiments of processes for updating the store and/or department identifier (s) assigned to a transmitter.

FIG. 4 comprises flow charts illustrating embodiments of processes associated with updating the firmware on a transmitter, which changes the entire code on the transmitter and reboots the transmitter with the new code. Since the store and/or department identifier(s) are part of the transmitter firmware, they are also updated in the process. Process 400 of FIG. 4 may comprise, for example, a server-side process. At step 402, new firmware is computed. In some cases, the new firmware is computed with a new wave file encoding the transmitter code. Since Bluetooth, and especially BTLE, is suited for small amounts of data transfer, piecewise updating is employed in some embodiments. Accordingly, the entire new firmware is divided into small pieces at step 404. At step 406, the pieces are assigned to clients, e.g., when they walk-in and detect a transmitter and/or depending on their walk-in history. Process 408 of FIG. 4 comprises a client-side process. At step 410, a chunk or piece of the new firmware is received. At step 412, the received piece of new firmware is sent to the transmitter, e.g., so that a small value corresponding to the received piece of new firmware can be updated on the transmitter. Process 414 of FIG. 4 comprises a transmitter-side process. At step 416, pieces comprising the new firmware are received, for example, from one or more clients. At step 418, a digital signature of the new firmware (e.g., an HMAC or another digital signature technique known to those skilled in the art, such as one using an asymmetric encryption such as RSA) is checked. At step 420, it is determined whether the digital signature check is successful. If the digital signature check is successful, the firmware is updated and the transmitter is restarted at step 422. If the digital signature check fails, the received firmware is discarded at step 424, and the existing firmware of the transmitter is not updated.

FIG. 5 comprises flow charts illustrating embodiments of processes associated with updating the transmitter identifier of a transmitter. In some embodiments, the transmitter identifier comprises a writable property (e.g., via Bluetooth GATT protocol) that can be updated by mobile handsets. Process 500 of FIG. 5 comprises a server-side process. At step 502, a new identifier for the transmitter is signed with the key (e.g., using HMAC or another digital signature technique known to those skilled in the art, such as one using an asymmetric encryption such as RSA). At step 504, the signed copy is sent to a mobile client, e.g., when it reports that a particular transmitter has been detected which is deemed by the server to need updating (on demand), or depending on the client's walk-in history or geographic location, e.g., if the client has a history of walking into the venue containing the transmitter or is geographically close to it (prefetching). Process 506 of FIG. 5 comprises a client-side process. At step 508, a signed identifier is received, e.g., at a mobile client from an associated server. At step 510, the signed identifier is sent to the transmitter for updating the identifier value. Process 512 of FIG. 5 comprises a transmitter-side process. At step 514, a signed identifier is received, e.g., at a transmitter from a mobile client. At step 516, the signed identifier is validated using its key in a manner similar to that described above. At step 518, it is determined whether the identifier is valid. If it is determined that the signed identifier is not valid, the transmitter identifier is not updated at step 520. However, if it is determined that the signed identifier is valid, the transmitter identifier is updated (for example, by communicating with the BTLE module via the USART), and the new identifier is broadcasted at step 522. Once the transmitter identifier is updated, a new audio wave file is generated on the transmitter using the new identifier. In some embodiments, process 506 optionally includes step 524 at which the handset verifies that the identifier has been updated and informs the server. In some embodiments, process 500 optionally includes step 526 at which an indication that the identifier has been updated is received at the server from the client and the database mappings of identifiers and venues/ departments is accordingly updated at the server.

In some embodiments, Wake-on-Bluetooth is employed for enabling sound based detection. That is, Bluetooth may be used to trigger audio-based detection on mobile handsets. In this technique, Bluetooth scanning, as described above, is used to detect a nearby transmitter, which can then trigger audio detection in an associated application to figure out the exact venue that the user is in. Alternately, the store may be known from the Bluetooth identifier, but presence may not be inferred until a corresponding or compatible audio signal is detected.

In some embodiments, mobile phones are used as Bluetooth relays. Another key mechanism to upgrade existing transmitters without a Bluetooth module (i.e., which only support audio-based signaling) is to turn BTLE enabled handsets into mini ad-hoc transmitters when they are in a store fitted with an audio transmitter. In this scheme, once a handset detects a code via audio signaling, it can then broadcast the same code over its BTLE transmitter and enable other users in the vicinity to take advantage of Bluetooth based detection or wake up as discussed above. This mechanism allows the upgrade of existing infrastructure with BTLE without any additional costs or hardware. It may also be used with initial BTLE detection to extend the range of a BTLE transmitter. In either case, an ad hoc transmitter may be configured to cease operation when a criterion has been reached, such as a threshold period of time since the primary transmitter was detected or detection of a distance traveled (e.g., by accelerometer or GPS or other means on the handset) since the primary transmitter was detected.

In some embodiments, Bluetooth enabled transmitters may be used for fine-grained indoor mapping. That is, the signal propagation properties of Bluetooth may be leveraged to perform fine-grained location mapping including, for example, accurate identification of a user when walking into a store and tracking of the user as the user visits different sections in the store. Such functionality may be achieved, for example, by placing one or more Bluetooth enabled transmitters in every department of a store and recording the signal strength of both audio and Bluetooth signals from all nearby transmitters on a mobile handset. In some such cases, clustering techniques (e.g., triangulation, sorting, etc.) may be employed to narrow the exact location of the mobile handset. Multiple signals from different transmitters can also be used as an authentication mechanism to safeguard against one-off transmitter thefts.

Many applications exist for the combined BTLE and audio-based transmitters described herein. As described, the addition of a BTLE module to the transmitter allows several tasks to be performed efficiently. For example, update of the store and/or department identifier(s) of a transmitter may be remotely accomplished. Moreover, a transmitter may be detected while an associated application is in the background using passive scanning of Bluetooth services as supported in iOS and Android. Such passive Bluetooth detection may trigger multiple actions depending on the situation including, for example, reminding a user to open an application to get rewards, popping up alerts about store and/or department specific offers, and using store specific information from an associated application and the user's profile to show targeted advertisements and reminders. Furthermore, a user may be suggested a store to check out when the user enters a mall. Since Bluetooth signals will bleed out of a store, they can be detected when the user is some distance away and could be used to suggest different stores based on latest promotions and the interests of the particular user.

Along with iOS 7, Apple introduced iBeacon. iBeacon comprises a specific format for broadcast messages that includes an identifier for the entity broadcasting as well as "major" and "minor" identifiers, which are capable of being used, for example, as store and/or department identifier(s). The exact format of an iBeacon broadcast can be readily observed by one skilled in the art by capturing the BTLE broadcasts of an iBeacon with known "major" and "minor" identifiers. An advantage of iBeacons is that iOS 7 includes OS-level support for iBeacons so that applications can register for being waken up on detection of an iBeacon with a specific identifier. However, a downside of iBeacons is that the standard iBeacon implementation makes it very easy to free ride on infrastructure, e.g., by registering to get alerted to a particular entity's beacons and then using the "major" and "minor" identifiers for location identification. If the iBeacon protocol is used in its basic form, these beacons can be used to wake up an application. Moreover, there is no code rotation capability, and it is trivial to forge any transmission, so iBeacon broadcasts are open to fraud.

In some embodiments, iBeacon and proprietary BTLE broadcasts are interleaved. That is, in order to take advantage of the wake-up feature of iBeacon, but to avoid free-riding by competitors, iBeacon advertisement packets are interleaved with custom proprietary broadcasts. iBeacon signals just contain a 128 bit UUID, with nonsense major and minor identifiers. This is purposefully done to prevent competitors from using proprietary infrastructure for presence detection. As described in detail above, store and/or department information in proprietary broadcasts is encrypted and/or digitally signed. In one example, iBeacon signals are interleaved with proprietary signals in a ratio of 3:1 (this value is tuned to minimize the latency of waking up but at the same time minimizing the time taken to decode the correct store and/or department information from proprietary broadcasts), though other ratios are also workable.

In some embodiments, the major and/or minor iBeacon identifier(s) are rotated to prompt frequent application wake ups. In order to register for wake up, an application needs to specify either the iBeacon identifier or a combination of the iBeacon identifier and major and/or minor identifier(s). In the former case, iOS will only wake up an application once on entering a range of an iBeacon source that is broadcasting a desired iBeacon identifier. Hence even if multiple beacons broadcasting an iBeacon identifier exist, only the beacon that is encountered first by a device will wake up an application. The rest of the beacons do not lead to application wake ups. This can be a problem in larger deployments where it is desirable for an application to wake up to different beacons broadcasting the same iBeacon UUID. There exist multiple ways of solving this problem. One solution includes assigning different major and/or minor identifier(s) to every physical beacon and having an application then register to be woken up to all those combinations of iBeacon identifier and major and/or minor identifier(s). In this case, though, any third party application can identify the specific locations of all the beacons and can free ride on the beacon deployment. Thus, this solution or scheme may not be desirable. A more viable solution includes having every physical beacon broadcast the iBeacon identifier and rotating between a set of major and/or minor identifier(s). The application still registers to be woken up by all the set of major and/or minor identifiers, but there is no way for a competitor to map a particular beacon source to a major and/or minor identifier. The rotation scheme may be chosen such that probabilistically nearby beacons broadcast different major and/or minor identifiers, allowing an application to be woken up when it comes near different physical beacons.

In some embodiments, the iBeacon identifier is changed to prevent third party wake ups. In order to completely prevent third party applications from registering for wake ups from a prescribed, proprietary iBeacon identifier, the iBeacon identifier is updated from a client. Such an update can take place in phases. Until all the beacons are updated to the new iBeacon identifier, an associated application registers to be woken up by both the old and the new iBeacon identifiers, but once the update is complete, the application can switch to just the new iBeacon identifier. Depending on the frequency of this update, it can make any third party applications that are unaware of the new iBeacon identifier unreliable for wake ups. Thus, any commercial application that relies on a prescribed iBeacon identifier to be constant will experience poor wake ups and will need to constantly monitor and/or sniff Bluetooth signals in the field to be abreast of the latest iBeacon identifier.

In some embodiments, the iBeacon broadcast may be completely disabled for any specific periods of time. That is, iBeacon support can be turned off completely if desired so that third party applications cannot use proprietary beacons at all for wake ups. This can be enforced for any random period of time or can be permanent. It provides a final defense for private infrastructure deployment against any form of free riding.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating an identifier that specifies a venue; and configuring each of a plurality of transmitters at the venue to transmit interleaved broadcasts comprising a plurality of protocols including a first signal for application wake up and a proprietary second signal that includes the identifier, wherein the first signal and the second signal are interleaved in a prescribed ratio;

wherein the transmitted broadcasts are captured by a first handset, the first signal is used for wake up of an application of the first handset, and the identifier is decoded from the proprietary second signal and used to infer presence of the first handset at the venue; and wherein different codes broadcast by the plurality of transmitters for application wake up are rotated among the transmitters so that there is no way to map a prescribed transmitter to a prescribed code, wherein the application of the handset is registered to be woken up by all the different codes, wherein the different codes broadcast by the plurality of transmitters are updated at a prescribed frequency, wherein at least one of the transmitters receives an updated code comprising a first update piece and a second update piece from a server via a plurality of handsets including the first handset and a second handset, wherein:

the first handset receives the first update piece from the server depending on a walk-in history of the first handset into the venue, wherein the at least one of the transmitters is updated when a digital signature check of the update code is successful, and wherein a verification of the transmitter update is received at the server via one or more of the plurality of handsets.

2. The method of claim 1, wherein the identifier comprises a store identifier that specifies a store.

3. The method of claim 1, wherein the identifier comprises a department identifier that specifies a department in a store.

4. The method of claim 1, wherein the first signal comprises an iBeacon broadcast and wherein the handset application is configured to detect an associated service identifier of the iBeacon broadcast.

5. The method of claim 1, wherein the identifier comprises a store identifier that specifies a store and a department identifier that specifies a department in the store.

6. The method of claim 1, wherein the first signal is interleaved with the proprietary second signal in a ratio of 3:1.

7. The method of claim 1, wherein the proprietary second signal is encrypted.

8. The method of claim 1, wherein the proprietary second signal is digitally signed.

9. The method of claim 1, wherein the first signal comprises an iBeacon broadcast and rotating iBeacon codes comprises rotating one or both of major and minor iBeacon identifiers.

10. The method of claim 1, wherein the codes for application wake up are updated to prevent third party wake ups.

11. The method of claim 1, wherein the identifier comprises a secure identifier.

12. The method of claim 1, wherein the identifier comprises a nonce.

13. The method of claim 1, wherein generating the identifier comprises computing a hash, wherein the hash includes at least one of a nonce value and a secret key.

14. The method of claim 1, further comprising configuring an ultrasonic transmitter to transmit the identifier via an ultrasonic channel.

15. The method of claim 1, wherein the first signal comprises an iBeacon broadcast and the second signal comprises a Bluetooth Low Energy (BTLE) broadcast.

16. The method of claim 1, wherein the broadcasts captured at the handset are processed by the application of the handset.

17. The method of claim 1, further comprising disabling the first signal for a prescribed period of time.

18. The method of claim 1, wherein:

the plurality of transmitters comprise an audio transmitter;

a third handset detects a code from the audio transmitter; and the third handset broadcasts the code from the audio transmitter, wherein the third handset is configured to stop broadcasting the code from the audio transmitter if a threshold period of time since the detection of the code from the audio transmitter by the third handset is reached.

19. A system, comprising:

a processor configured to generate an identifier that specifies a venue; and each of a plurality of transmitters at the venue configured to transmit interleaved broadcasts comprising a plurality of protocols including a first signal for application wake up and a proprietary second signal that includes the identifier, wherein the first signal and the second signal are interleaved in a prescribed ratio;

wherein the transmitted broadcasts are captured by a first handset, the first signal is used for wake up of an application of the first handset, and the identifier is decoded from the proprietary second signal and used to infer presence of the first handset at the venue; and wherein different codes broadcast by the plurality of transmitters for application wake up are rotated among the transmitters so that there is no way to map a prescribed transmitter to a prescribed code, wherein the application of the handset is registered to be woken up by all the different codes, wherein the different codes broadcast by the plurality of transmitters are updated at a prescribed frequency, wherein at least one of the transmitters receives an updated code comprising a first update piece and a second update piece from a server via a plurality of handsets including the first handset and a second handset, wherein:

the first handset receives the first update piece from the server depending on a walk-in history of the first handset into the venue, wherein the at least one of transmitters is updated when a digital signature check of the update code is successful, and wherein a verification of the transmitter update is received at the server via one or more of the plurality of handsets.

20. A computer program product, the computer program product being embodied in a non-transitory computer readable storage medium and comprising computer instructions for:

generating an identifier that specifies a venue; and configuring each of a plurality of transmitters at the venue to transmit interleaved broadcasts comprising a plurality of protocols including a first signal for application wake up and a proprietary second signal that includes the identifier, wherein the first signal and the second signal are interleaved in a prescribed ratio;

wherein the transmitted broadcasts are captured by a first handset, the first signal is used for wake up of an application of the first handset, and the identifier is decoded from the proprietary second signal and used to infer presence of the first handset at the venue; and wherein different codes broadcast by the plurality of transmitters for application wake up are rotated among the transmitters so that there is no way to map a prescribed transmitter to a prescribed code, wherein the application of the handset is registered to be woken up by all the different codes, wherein the different codes broadcast by the plurality of transmitters are updated at a prescribed frequency, wherein the different codes broadcast by the plurality of transmitters are updated at a prescribed frequency, wherein at least one of the transmitters receives an updated code comprising a first update piece and a second update piece from a server via a plurality of handsets including the first handset and a second handset, wherein:

the first handset receives the first update piece from the server depending on a walk-in history of the first handset into the venue, wherein the at least one of the transmitters is updated when a digital signature check of the update code is successful, and wherein a verification of the transmitter update is received at the server via one or more of the plurality of handsets.

* * * * *